United States Patent
Teramoto et al.

(10) Patent No.: US 10,059,286 B2
(45) Date of Patent: Aug. 28, 2018

(54) ELECTRIC POWER SOURCE SYSTEM

(71) Applicant: DENSO CORPORATION, Kariya, Aichi-pref. (JP)

(72) Inventors: Toshiyo Teramoto, Kariya (JP); Shigenori Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 48 days.

(21) Appl. No.: 15/060,987

(22) Filed: Mar. 4, 2016

(65) Prior Publication Data
US 2016/0257270 A1 Sep. 8, 2016

(30) Foreign Application Priority Data

Mar. 6, 2015 (JP) .................................. 2015-044239

(51) Int. Cl.
| | |
|---|---|
| B60R 16/033 | (2006.01) |
| H01M 10/06 | (2006.01) |
| H01M 10/0525 | (2010.01) |
| H01M 10/48 | (2006.01) |
| H01M 16/00 | (2006.01) |
| B60L 1/00 | (2006.01) |
| B60L 11/18 | (2006.01) |
| B60W 10/00 | (2006.01) |

(52) U.S. Cl.
CPC .............. *B60R 16/033* (2013.01); *B60L 1/00* (2013.01); *B60L 11/1868* (2013.01); *B60W 10/00* (2013.01); *H01M 10/0525* (2013.01); *H01M 10/06* (2013.01); *H01M 10/48* (2013.01); *H01M 16/00* (2013.01); *B60L 2260/26* (2013.01); *H01M 2220/20* (2013.01); *Y02T 10/7011* (2013.01); *Y02T 10/7016* (2013.01)

(58) Field of Classification Search
None
See application file for complete search history.

(56) References Cited

U.S. PATENT DOCUMENTS

2012/0330538 A1* 12/2012 Spjuth ................ F02N 11/0866
701/113

FOREIGN PATENT DOCUMENTS

| JP | 2006-335253 A | 12/2006 |
|---|---|---|
| JP | 2012-56434 A | 3/2012 |
| JP | 2012-130108 A | 7/2012 |
| JP | 2013-023103 A | 2/2013 |
| JP | 2014-184752 A | 10/2014 |
| JP | 2015-42509 A | 3/2015 |
| JP | 2015-109741 A | 6/2015 |
| JP | 2015-154618 A | 8/2015 |

* cited by examiner

Primary Examiner — Thienvu Tran
Assistant Examiner — David M Stables
(74) Attorney, Agent, or Firm — Oliff PLC

(57) ABSTRACT

An electric power source system for a vehicle includes a lead-acid battery electrically connected with the starting device in parallel as a first storage battery, a second storage battery electrically connected with the starting device in parallel, a switch device disposed between the lead-acid battery and the second storage battery on an electrical path connecting the lead-acid battery with the second storage battery, at least one electrical load electrically connected to the electrical path and disposed closer to the lead-acid battery, and a switch controller controlling the switch device to maintain a closed state except an engine start duration while the engine is being started by a starting device after a power of the vehicle is turned on.

7 Claims, 7 Drawing Sheets

US 10,059,286 B2

ELECTRIC POWER SOURCE SYSTEM

CROSS REFERENCE TO RELATED APPLICATION

This application is based on Japanese Patent Application No. 2015-044239 filed on Mar. 6, 2015, the disclosure of which is incorporated herein by reference.

TECHNICAL FIELD

The present disclosure relates to an electric power source system for a vehicle.

BACKGROUND

An electric power source system for a vehicle includes multiple kinds of storage batteries, such as lead-acid batteries and lithium-ion batteries. These different kinds of storage batteries properly supply power to different electrical loads equipped to the vehicle.

For example, as disclosed in JP 2012-130108 A, a lead-acid battery and a lithium-ion battery are connected with each other through a switch. Some of the electrical loads in the vehicle need to be supplied with stabilized electric power. Herein, stabilized electric power is a power that has a constant voltage or a voltage fluctuating only within a predetermined range. These kinds of electrical loads are connected to the lithium-ion battery. In this configuration, the lithium-ion battery provides power supply to the electrical loads, which require the stabilized power supply. Among the electrical loads, except the electrical loads, which require the stabilized power supply, a starter motor and other general electrical loads, such as headlamps are connected to the lead-acid battery. In this configuration, the lead-acid battery provides power supply to the starter motor and other general electrical loads.

In the above-described configuration, when the lead-acid battery has an operation failure, the lead-acid battery cannot supply power to the general electrical loads connected thereto. Similarly, when the lithium-ion battery has an operation failure, the lithium-ion battery cannot supply stabilized power to the electrical loads that require the stabilized power supply. Accordingly, operation failures or abnormalities may occur to the electrical loads that require the stabilized power supply.

SUMMARY

In view of the foregoing difficulties, it is an object of the present disclosure to provide an electric power source system which can continuously and stably provide a power supply to different kinds of electrical loads.

According to an aspect of the present disclosure, an electric power source system for a vehicle includes a lead-acid battery, a second storage battery, a switch device, at least one electrical load, and a switch controller. Herein, the vehicle includes a starting device driven by an electric power and starts an engine of the vehicle. The starting device is provided by an electric power generator. The lead-acid battery is electrically connected with the starting device in parallel as a first storage battery. The second storage battery is electrically connected with the starting device in parallel. The switch device is disposed between the lead-acid battery and the second storage battery on an electrical path that electrically connects the lead-acid battery with the second storage battery. The at least one electrical load is electrically connected to the electrical path and is disposed closer to the lead-acid battery compared with the second storage battery on the electrical path. The switch controller, after a power of the vehicle is turned on, controls the switch device to maintain a closed state except an engine start duration while the engine is being started by the starting device.

With the above electric power source system, a power supply can be continuously and stably provided to the electrical loads equipped to the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe an embodiment of the present disclosure with reference to accompanying drawings. In the present embodiment, a vehicle to which an electric power source system is equipped uses an internal combustion engine as a driving power source. The vehicle has an idling reduction function and a coasting travel function.

Figure 1:
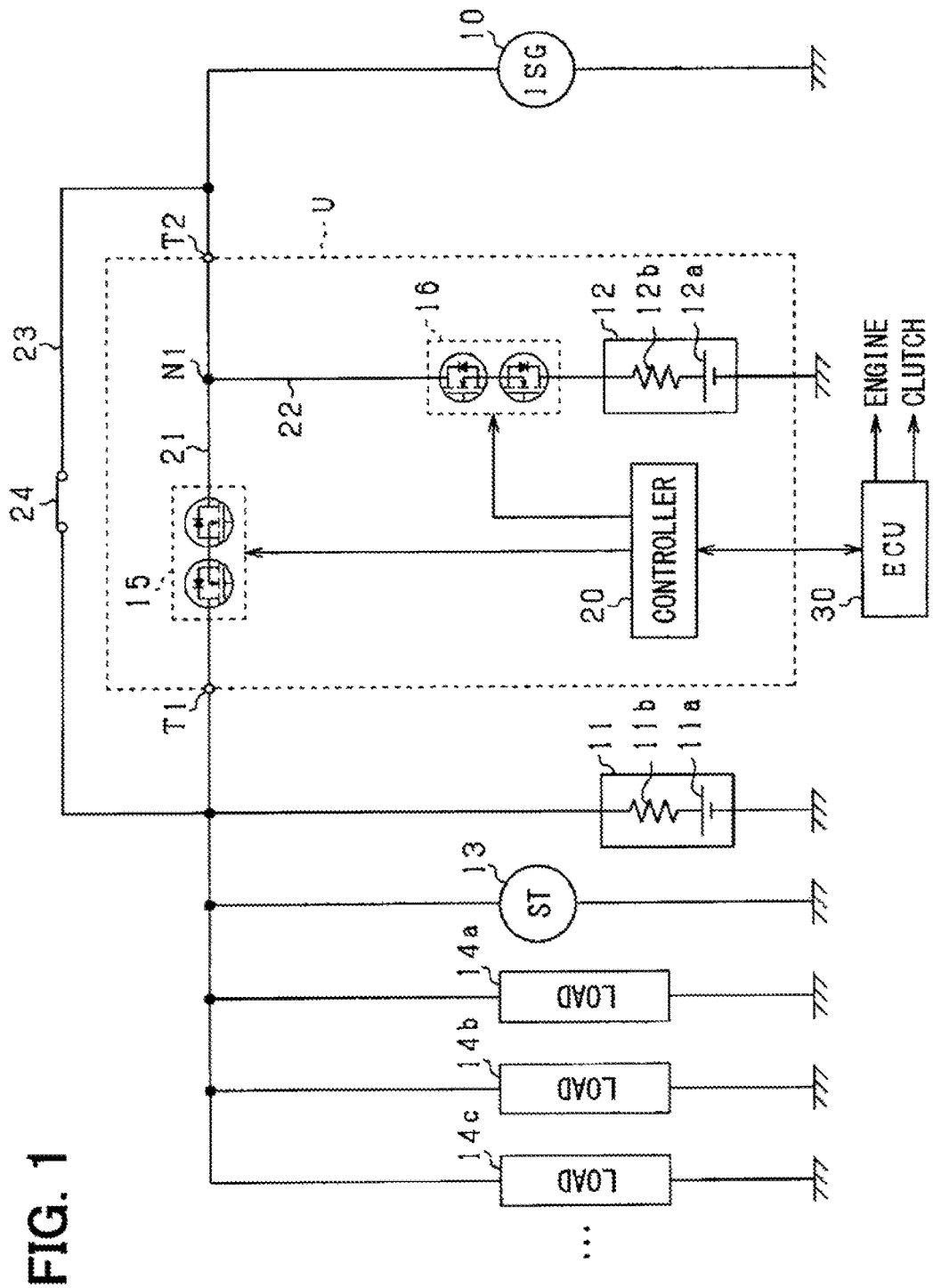
FIG. 1 is a circuit diagram showing an electric power source system according to an embodiment of the present disclosure.

As shown in FIG. 1, the electric power source system includes a rotator 10, a lead-acid battery (Pb BATTERY) 11, a lithium-ion battery (Li BATTERY) 12, a starter (ST) 13, multiple electrical loads (LOAD) 14a to 14c, a metal oxide semiconductor (MOS) switch 15, and a switch mode rectifier (SMR) switch 16. The lithium-ion battery 12 and the switches 15, 16 are housed in a case which is not shown, and are integrated with each other. This integrated member is referred to as a battery unit U. The battery unit U further includes a controller 20 for controlling the lithium-ion battery 12. The switches 15, 16 and the controller 20 are mounted on the same board and the board is housed in the case.

The battery unit U further includes a first terminal T1 and a second terminal T2. The lead-acid battery 11, the starter 13, and the electrical loads 14a to 14c are connected to the first terminal T1, and the rotator 10 is connected to the second terminal T2. Each of the two terminals T1 and T2 supports a high current flow, such as an input current or an output current of the rotator 10.

A rotation axis of the rotator 10 is operably connected, using a belt or the like, to an output axis of an engine, which is not shown. When the output axis of the engine rotates, the rotation axis of the rotator 10 is driven to rotate. When the rotation axis of the rotator 10 rotates, the output axis of the engine is driven to rotate. The rotator 10 can generate or regenerate electric power using a rotation of the output axis of the engine or using a rotation of a vehicle axle. Further, the rotator 10 provides a rotation force to the output axis of the engine to drive the engine. Thus, the rotator 10 can generate electric power, and also can drive the engine by outputting the driving power to the engine. In the present disclosure, the rotator is provided by an integrated starter generator (ISG).

The lead-acid battery 11 and the lithium-ion battery 12 are connected in parallel with respect to the rotator 10. When the rotator 10 generates electric power, the batteries 11 and 12 can be charged by the generated electric power. The rotator 10 is driven by the electric power supplied from each of the batteries 11 and 12.

The lead-acid battery 11 is a well-known storage battery. Compared with the lead-acid battery 11, the lithium-ion battery 12 has a lower power loss in charging and discharging operation, and output density and energy density of the lithium-ion battery 12 are higher than those of the lead-acid battery 11. Thus, the lithium-ion battery 12 is a high-density storage battery. In the present disclosure, the lithium-ion battery 12 is described as an example of a second storage battery, and the lead-acid battery 11 is described as an example of a first storage battery. In the present disclosure, the second storage battery has a higher output power density and a higher energy density than the first storage battery.

In the lead-acid battery 11, positive electrode active material is provided by lead dioxide ($PbO_2$), negative electrode active material is provided by lead (Pb), and electrolyte is provided by sulfuric acid ($H_2SO_4$). The lead-acid battery 11 includes multiple battery cells having the above-described electrode material, and the multiple battery cells are connected in series. These multiple battery cells configure a battery cell group 11a. In the present embodiment, suppose that an electric storage capacity of the lead-acid battery 11 is greater than an electric storage capacity of the lithium-ion battery 12.

In the lithium-ion battery 12, positive electrode active material is provided by oxide including lithium, such as lithium composite metal oxide. For example, the lithium composite metal oxide may include $LiCoO_2$, $LiMn_2O_4$, $LiNiO_2$, $LiFePO_4$ or the like. In the lithium-ion battery 12, negative electrode active material is provided by alloy including carbon (C), graphite, lithium titanate (for example, $Li_xTiO_2$), Si, Su or the like. In the lithium-ion battery 12, electrolyte is provided by organic electrolyte. The lithium-ion battery 12 includes multiple battery cells having the above-described electrode material, and the multiple battery cells are connected in series. These multiple battery cells configure a battery cell group 12a.

As shown in FIG. 1, the lead-acid battery 11 includes the battery cell group 11a and an internal resistance 11b. Similarly, the lithium-ion battery 12 includes the battery cell group 12a and an internal resistance 12b. In the following description, a voltage generated by the battery cell group 11a, 12a in open state is represented as an open voltage V0, a current flowing through the battery 11, 12 in a discharging state is represented as a discharging current Id, a current flowing through the battery 11, 12 in a charging state is represented as a charging current Ic. The internal resistance 11b and 12b has a resistance value of R. In this case, the terminal voltage Vd in discharging state and the terminal voltage Vc in charging state are defined by the following expressions 1 and 2.

$$Vd=V0-Id\times R \quad \text{(Expression 1)}$$

$$Vc=V0+Ic\times R \quad \text{(Expression 2)}$$

As shown by the expressions 1 and 2, the terminal voltage Vd in the discharging state decreases with an increase of the internal resistance value R, and the terminal voltage Vc in the charging state increases with an increase of the internal resistance value R.

Among the electrical loads 14a to 14c, the electrical loads 14a and 14b need to be protected by constantly and stably supplying the operation voltage under which the electrical loads 14a and 14b are able to normally operate. That is, the electrical loads 14a and 14b need to be supplied with a stabilized electric power. Herein, the stabilized electric power is a power that has a constant voltage or a voltage fluctuating only within a predetermined range. Thus, the electrical loads 14a and 14b are driven within a predetermined voltage range, and stop operation when the supply voltage goes out of the predetermined voltage range. That is, when the supply voltage goes out of the predetermined voltage range, the electrical loads 14a and 14b are reset.

The electrical load 14a, which requires the stabilized power supply, is an electrical load related to a vehicle travelling. For example, the electrical load 14a may be a brake device, an oil pump included in an automatic transmission, a fuel pump, an electric power steering device or the like. The electrical load 14a is a travelling related electrical load for controlling a travelling behavior of the vehicle.

The electrical load 14b, which also requires the stabilized power supply, is an electrical load other than the travelling related electrical load. For example, the electrical load 14b may be a navigation device, a display device for displaying various meters, an audio device or the like. The electrical loads 14a and 14b can operate in a stable manner by suppressing the voltage fluctuation of the supply power to the electrical loads 14a and 14b.

The electrical load 14c is a general electrical load other than the starter 13 and the electrical loads 14a, 14b. As described above, the electrical loads 14a, 14b require stabilized power supply. The electrical load 14c is able to operate under a voltage range which is larger in scope than the predetermined voltage range required by the electrical loads 14a, 14b. For example, the general electrical load may be headlamps, front windshield wipers, a ventilation fan of an air conditioning device, a defroster heater of a rear windshield or the like. When the voltage of the supply power to the headlamps, wipers and ventilation fun fluctuates, a blinking of the headlamps, operation speed change of the wipers, and rotation speed change of the ventilation fan may occur. The rotation speed change of the ventilation fan may cause a change of air-blowing sound. Thus, the voltage of the supply power to these devices needs to be constant.

The battery unit U has a first connections path 21 and a second connection path 22, which are disposed inside of the battery unit U. The first and second connection paths 21, 22 connect the terminals T1, T2 with the lithium-ion battery 12. Specifically, the first connection path 21 connects the first terminal T1 with the second terminal T2, and includes the MOS switch 15 as a switch device. Further, the second connection path 22 connects a point N1 of the first connection path 21 with the lithium-ion battery 12. Herein, the point N1 of the first connection path 21 is disposed between the first terminal T1 and the second terminal T2, and is referred to as a battery connection point. Further, the second connection path 22 includes the SMR switch 16. Each of the MOS switch 15 and the SMR switch 16 includes multiple MOS field effect transistors (FETs), and the number of the MOSFETs is 2×n. Herein, n indicates an integer number. Specifically, each two MOSFETs configure one MOSFET set, and the MOSFETs are connected in series so that a parasitic diode of each MOSFET set is in reverse direction with a parasitic diode of an adjacent MOSFET set. With this configuration, when the switches 15, 16 are in off states, a current flowing through the path on which each switch 15, 16 is disposed can be completely interrupted by the parasitic diode of the corresponding switch.

The electric power source system further includes a bypass path 23 which bypasses the MOSFET switch 15. By the bypass path 23, the lead-acid battery 11 is able to be directly connected with the rotator 10 without through the MOS switch 15. Specifically, the bypass path 23 directly and electrically connects an electrical path, which is connected to the first terminal T1, with an electrical path, which is connected to the second terminal T2, without passing through the battery unit U. Herein, the electrical path which is connected to the first terminal T1 is an electrical path connected to the lead-acid battery 11, and the electrical path which is connected to the second terminal T2 is an electrical path connected to the rotator 10. The bypass path 23 includes a bypass switch 24 as a power supply control device that enables or disables a connection between a circuit part disposed on the lead-acid battery 11 side and a circuit part disposed on the rotator side. The bypass switch 24 is a normally closed type relay switch. The bypass path 23 and the bypass switch 24 may also be included in the battery unit U. In this case, the bypass path 23 and the bypass switch 24 are configured to bypass the MOS switch 15 in the battery unit U.

The controller 20 is connected with an electronic control unit (ECU) 30, which is disposed outside of the battery unit U. The controller 20 is communicably connected with the ECU 30 via a communication network, such as controller area network (CAN). The controller 20 is communicable with the ECU 30 in bidirectional manner. Further, data stored in the controller 20 and the ECU 30 can be shared by both the controller 20 and the ECU 30. The ECU 30 performs an idling reduction control and a coasting travel control. In the idling reduction control, the engine operation is automatically stopped when a predetermined automatic stop condition is satisfied, and the engine is restarted in response to a satisfaction of a predetermined restart condition from the stopped state. In the coasting travel control, the vehicle is controlled to perform an inertial travelling under a state in which a fuel supply to the engine is deactivated. The inertial travelling aims to improve fuel efficiency. During a travelling of a vehicle, when the accelerator is turned off, a clutch disposed between the engine and the transmission disconnects the engine from the transmission to control the vehicle travel with use of inertia of itself.

In each of the idling reduction control and the coasting travel control, the engine is automatically turned off in response to a satisfaction of a predetermined automatic engine stop condition, such as an accelerator off. After the engine is turned off, when a restart condition is satisfied, the engine is restarted by the rotator 10.

As described above, the rotator 10 also generates electric power by the rotation energy output from the output axis of the engine. Specifically, when a rotor included in the rotator 10 starts rotation driven by the output axis of the engine, an excitation current is generated in a rotor coil, and an alternating current is induced in a stator corresponding to the excitation current generated in the rotor coil. Then, the generated alternating current is converted to a direct current by a rectifier, which is not shown. The excitation current generated in the rotor coil is regulated by a regulator in order to control the direct current generated by the rotator 10 has a predetermined regulation voltage Vreg.

The electric power generated in the rotator 10 is supplied to the electrical loads 14a to 14c, and is also stored in the lead-acid battery 11 and the lithium-ion battery 12. When the engine stops the operation and the rotator 10 correspondingly stops the electric power generation, the lead-acid battery 11 and the lithium-ion battery 12 supply electric power to the electrical loads 14a to 14c. The discharging amount from the lead-acid battery 11 and the lithium-ion battery 12 to the electrical loads 14a to 14c is properly controlled within a SOC-based use range to avoid an overdischarging. Similarly, the charging amount to the lead-acid battery 11 and the lithium-ion battery 12 by the rotator 10 is properly controlled within the SOC-based use range to avoid an overcharging. Herein, SOC stands for state of charge, and indicates an available battery level. The SOC also indicates a ratio of an actually charged battery level with respect to a fully charged level.

The controller 20 performs a protection control to protect the battery 12 from the overcharging and the overdischarging. Specifically, the controller 20 limits charging amount to the lithium-on battery 12 or limits discharging amount from the lithium-ion battery 12 to control the SOC of the lithium-ion battery 12 is property within a predetermined use range. The predetermined use range W2 indicated in FIG. 2B will be described later in detail.

In order to perform the protection control, the controller 20 continuously acquires the detected terminal voltages Vc(Li) and Vd(Li) of the lithium-ion battery 12 or the detected open voltage V0(Li) of the lithium-ion battery 12. The controller 20 also continuously acquires a current passing through the lithium-ion battery 12 detected by a current detector, which is not shown. For example, when the terminal voltage Vd of the lithium-ion battery 12 in the discharging state decreases lower than a lower limit voltage, the rotator 10 is activated to supply charging power to the lithium-ion battery 12 in order to protect the lithium-ion battery 12 from the overdischarging. Herein, the lower limit voltage is preliminarily set corresponding to a lower limit of the SOC use range. In the present embodiment, the lower limit of the SOC use range is defined as 10%. At the same time, the controller 20 controls the terminal voltage Vc of the lithium-ion battery 12 during the charging state to be equal to or lower than an upper limit voltage in order to protect the lithium-ion battery 12 from the overcharging by instructing a change of the regulation voltage Vreg. Herein, the upper limit voltage is preliminarily set corresponding to an upper limit of the SOC use range. In the present embodiment, the upper limit of the SOC use range is defined as 90%.

For the lead-acid battery 11, a battery controller, which is similar to the above-described controller 20 but not shown, performs similar protection control to the lead-acid battery 11.

In the present embodiment, the rotator 10 uses a regeneration energy of the vehicle, which is generated during a speed reduction of the vehicle, to generate the electric power and charges the two storage batteries 11, 12 with the generated electric power. In the charging, the lithium-ion battery 12 is mainly charged by the generated electric power. This kind of regeneration with the use of vehicle speed reduction is carried out in response to a speed reduction of the vehicle or a deactivation of fuel injection to the engine.

In the present embodiment, among the two storage batteries 11 and 12, the charging and discharging of the lithium-ion battery 12 is carried out at a higher priority. The following will describe a characteristic of each battery 11, 12 with reference to FIG. 2A to FIG. 3.

Figure 2A:
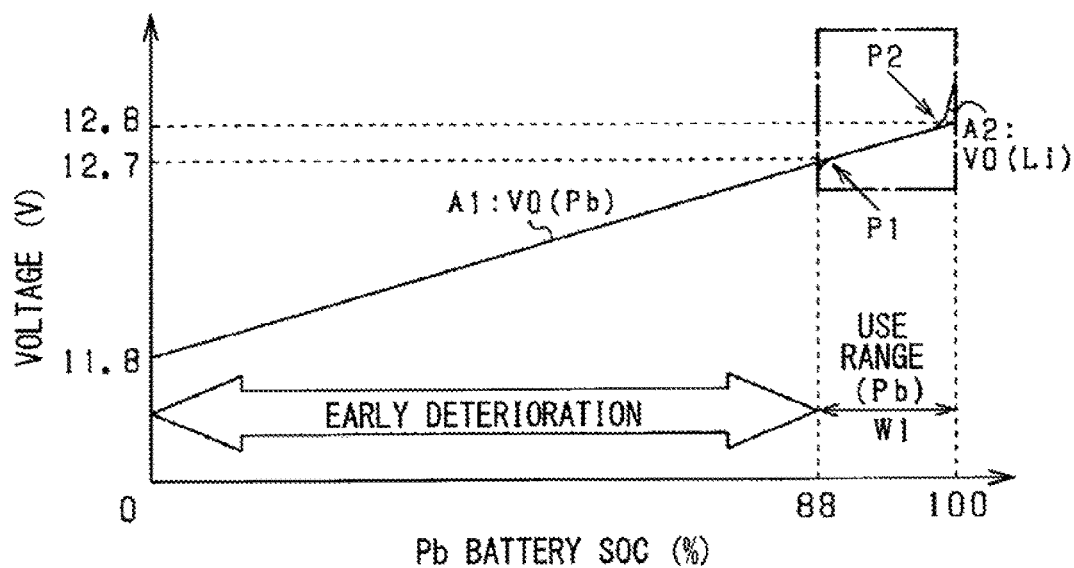
FIG. 2A is a diagram showing a SOC-based use range of a lead-acid battery.

In a graph shown in FIG. 2A, a horizontal axis indicates SOC of the lead-acid battery 11, and a solid line A1 is a voltage characteristic line indicating a relationship between the open voltage V0(Pb) of the lead-acid battery 11 and the SOC of the lead-acid battery 11. The open voltage V0(Pb) proportionally increases with an increase of the SOC. Herein, the increase of the SOC indicates an increase of the charging amount to the lead-acid battery 11. In a graph shown in FIG. 2B, a horizontal axis indicates SOC of the lithium-ion battery 12, and a solid line A2 is a voltage characteristic line indicating a relationship between the open voltage V0(Li) of the lithium-ion battery 12 and the SOC of the lithium-ion battery 12. The open voltage V0(Li) increases with an increase of the SOC. Herein, the increase of the SOC indicates an increase of the charging amount to the lithium-ion battery 12. The voltage characteristic line A2 includes two inflection points P1 and P2. At each inflection point P1, P2, a slope of the voltage characteristic line A2 is sharply changed. A segment between the two inflection points P1 and P2 has a relatively small change of slope.

When the storage batteries 11, 12 perform overdischarging or overcharging, early deterioration may occur to the storage batteries 11, 12. Thus, the storage batteries 11, 12 need to be controlled to work in a range other than an overcharging range or an overdischarging range. That is, the storage batteries 11, 12 need to be controlled to work in a proper use range which is defined based on SOC. Hereinafter, the proper use range defined based on SOC is also referred to as SOC-based use range. The SOC-based use range W1(Pb) of the lead-acid battery 11 may be defined within a range of 88% to 100%, and the SOC-based use range W2(Li) of the lithium-ion battery 12 may be defined within a range of 10% to 90%. The SOC-based use range W2(Li) of the lithium-ion battery 12 may also be defined to be greater than 0% and smaller than 100%.

Figure 2B:
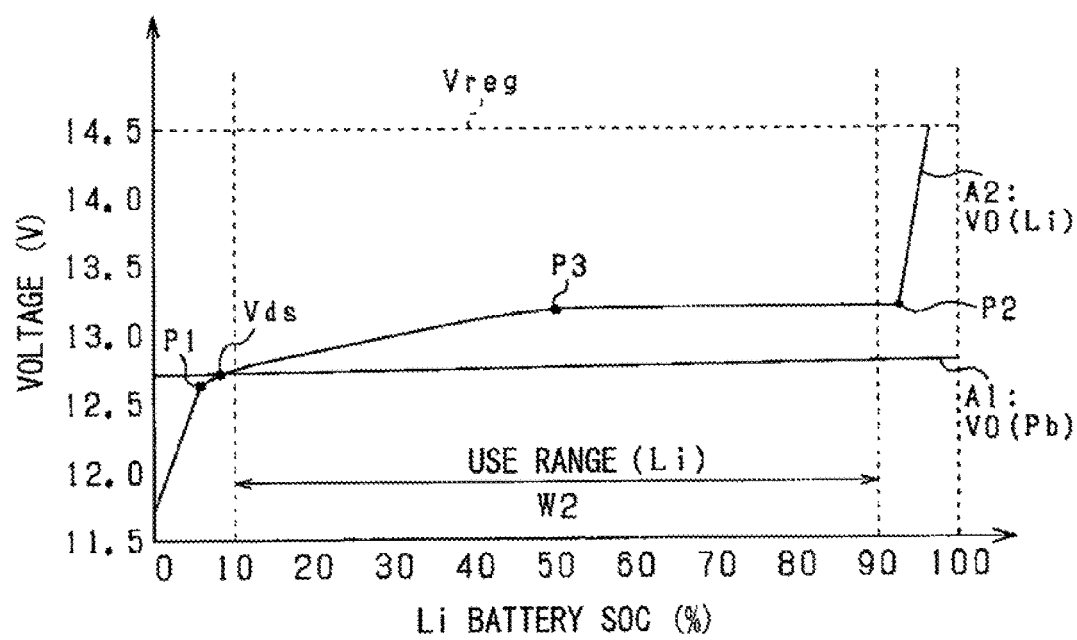
FIG. 2B is a diagram showing a SOC-based use range of a lithium-ion battery.

In the lead-acid battery 11, the early deterioration may occur within the SOC range of 0% to 88%. Further, FIG. 2B is an enlarged view of a part shown by a chain line in FIG. 2A. The part shown by a chain line corresponds to the SOC-based use range W1(Pb) of the lead-acid battery 11. As shown in FIG. 2A and FIG. 2B, a point corresponding to the SOC value of 0% related to the lead-acid battery 11 shown in FIG. 2B corresponds to the SOC value of 88% related to the lithium-ion battery 12. Herein, the SOC value of 88% of the lithium-ion battery 12 is a start point of the SOC-based use range W1(Pb) of the lead-acid battery 11.

The battery characteristic of the lithium-ion battery 12 is preliminarily set so that the voltage characteristic of the lithium-ion battery 12 satisfies the following five conditions including first condition to fifth condition. The setting of the battery characteristic of each storage battery 11, 12 may be achieved by properly setting the open voltage V0 and the internal resistance value R. In the lithium-ion battery 12, the setting of open voltage V0 may be achieved by properly selecting the positive electrode active material, the negative electrode active material and the electrolyte.

1. First Condition

As shown in FIG. 2B, within a total SOC range (0% to 100%) of the lithium-ion battery 12, a specific point Vds exists within a predetermined region at a lower SOC side of the SOC-based use range W2(Li). At the specific point Vds, the open voltage V0(Li) of the lithium-Ion battery 12 is equal to the open voltage V0(Pb) of the lead-acid battery 11. Further, within the whole range of the SOC-based use range W2(Li), the open voltage V0(Li) of the lithium-ion battery 12 is always higher than the open voltage V0(Pb) of the lead-acid battery 11. In the battery characteristic shown in FIG. 2B, one inflection point P1 is defined corresponding to a SOC lower than a lower limit of the SOC-based use range W2(Li) and the other inflection point P2 is defined corresponding to a SOC higher than a upper limit of the SOC-based use range W2(Li). Further, on the voltage characteristic line A2, the specific point Vds is disposed corresponding to a higher SOC side compared with the inflection point P1. As another example, the specific point Vds may be disposed corresponding to a lower SOC side compared with the inflection point P1.

2. Second Condition

Figure 3:
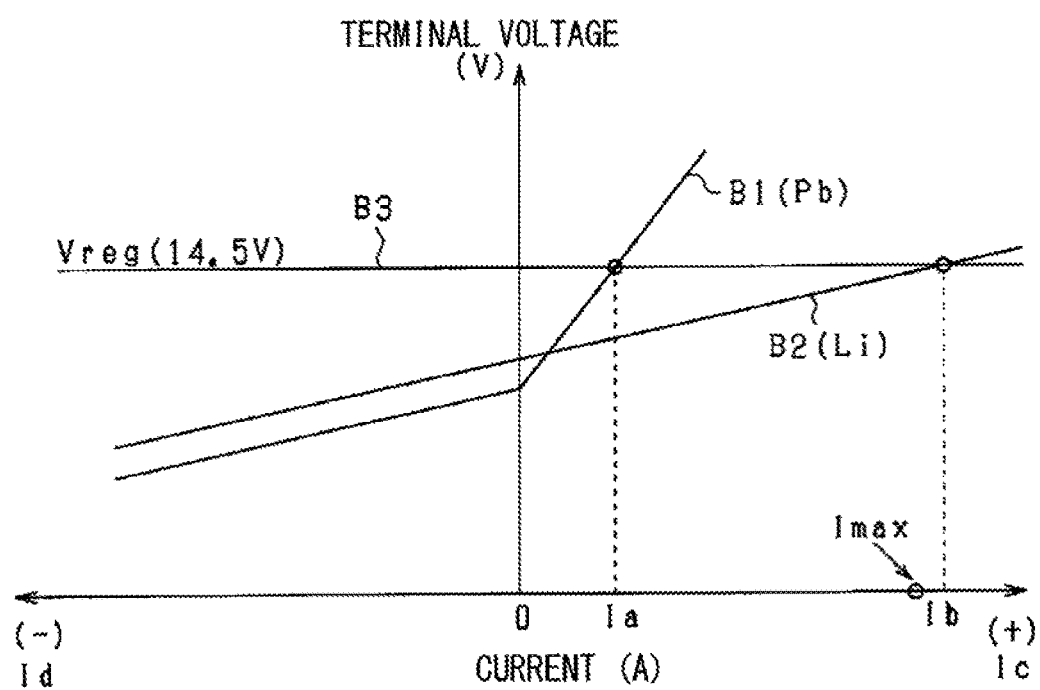
FIG. 3 is a diagram showing an I-V characteristic of a lead-acid battery and an I-V characteristic of a lithium-ion battery.

During the charging state, the internal resistance value R(Li) of the lithium-ion battery 12 and the internal resistance value R(Pb) of the lead-acid battery 11 are set to satisfy a relationship R(Li)<R(Pb). During the discharging state, the internal resistance value R(Li) of the lithium-ion battery 12 and the internal resistance value R(Pb) of the lead-acid battery 11 are set to satisfy a relationship R(Li)≤R(Pb). A difference between the current-voltage (IV) characteristics of the two batteries 11 and 12 is shown in FIG. 3. In FIG. 3, a solid line B1(Pb) indicates the IV characteristic of the lead-acid battery 11, a solid line B2(Li) indicates the IV characteristic of the lithium-ion battery 12, a solid line B3 indicates a regulated voltage Vreg. In the graph shown in FIG. 3, the horizontal axis indicates the current Ic, Id, and the vertical axis indicates the terminal voltage Vc, Vd. Further, the current Ic during the charging state is indicated by positive quantity, and the current Id during the discharging state is indicated by negative quantity.

In each of the IV characteristic lines B1 and B2, the terminal voltage Vc during the charging state proportionally increases with an increase of the charging current Ic, and the terminal voltage Vd during discharging state proportionally decreases with a decrease of the discharging current Id. Herein, the increase of the terminal voltage Vc indicates the charging state, and the decrease of the terminal voltage indicates the discharging state. A slope of each of the IV characteristic lines B1 and B2 indicates the internal resistance value R. In the lithium-ion battery 12, the internal resistance value R(Li) is the same during the charging state and the discharging state. In the lead-acid battery 11, the internal resistance value R(Pb) during the charging state is larger than the internal resistance value R(Pb) during the discharging state. Thus, during the charging state, the internal resistances R of the two batteries satisfy the relationship R(Li)<R(Pb). Further, during the discharging state, the internal resistances R of the two batteries satisfy the relationship R(Li)≤R(Pb).

For satisfying the above-described condition, during the operation state of the electrical loads 14a to 14c, that is, during the discharging state of the batteries 11, 12, the terminal voltages Vd may be set to satisfy a relationship Vd(Li)>Vd(Pb). Further, during the charging of the batteries 11, 12 by the rotator 10, the terminal voltages may be set to satisfy a relationship Vc(Li)>Vc(Pb) within a predetermined range close to a zero point of the current Ic, and the terminal voltages may be set to satisfy a relationship Vc(Li)<Vc(Pb) in a remaining range except the predetermined range close to the zero point of the current Ic. Under this setting condition, the internal resistance value R(Li) of the lithium-ion battery 12 can be controlled to be smaller than the internal resistance value R(Pb) of the lead-acid battery 11 during the changing state of the batteries 11, 12.

3. Third Condition

During the charging state, during a maximum charging current (Imax) flow through the lithium-ion battery 12, the terminal voltage Vc(Li) of the lithium-ion battery 12 is set to be lower than the regulation voltage Vreg generated by the rotator 10. That is, during the charging state, the lithium-ion battery 12 has the terminal voltage Vc(Li), and a value of the terminal voltage Vc(Li), which corresponds to the upper limit (90%) of the SOC-based use range W2(Li), is set to be lower than the regulation voltage Vreg.

4. Fourth Condition

The SOC-based use range W2(Li) of the lithium-ion battery 12 includes a center point P3 at a center position of the SOC-based use range W2(Li). A slope of the voltage characteristic line A2 corresponding to a lower SOC side of the center point P3 is set different from a slope of the voltage characteristic line A2 corresponding to a higher SOC side of the center point P3. Herein, the slope of the voltage characteristic line A2 indicates a changing rate of the open voltage with respect to the SOC. When satisfying this condition, the voltage characteristic line A2 has a wave shape which is protruded upward. In this case, with respect to the center point P3, the slope (average slope) of the voltage characteristic line A2 at the lower SOC side is greater than the slope of the voltage characteristic line A2 at the higher SOC side. Further, instead of defining the center point P3 at the center position of the SOC-based use range W2(Li), a point may be defined as a reference close to the upper limit of the SOC-based use range W2(Li) or close to the lower limit of the SOC-based use range W2(Li). In this case, the slope of the voltage characteristic line A2 may be set based on the reference point defined close to the upper limit or the lower limit of the SOC-based use range W2(Li).

5. Fifth Condition

In the voltage characteristic line A2 of the lithium-ion battery 12, a segment between the inflection points P1 and P2 has a relatively small slope, and a segment corresponding to the lower SOC side of the inflection point P1 and a segment corresponding to the higher SOC side of the inflection point P2 have respective slopes higher than the slope of the segment between the inflection points P1 and P2.

The controller 20 controls turning on and turning off of each switch 15, 16. Thus, the controller 20 is also referred to as a switch controller. When the ignition switch of the vehicle is in off state, the controller 20 maintains the switches 15, 16 in off states. When the ignition switch is turned on, the controller 20 maintains the MOS switch 15 and the SMR switch 16 in on states, and then, when the engine start is activated by the rotator 10, the controller 20 turns off the MOS switch 15. The controller 20 also turns off the MOS switch 15 when the engine is restarted from the off state after the ignition switch of the vehicle is turned on. In this case, after the turning on of the ignition switch, the stop of the engine may be caused by the idling reduction control or the coasting travel control, and then the engine is restarted from the off state in response to a satisfaction of the engine restart condition.

With the above-described configuration, after the turning on of the vehicle power (ignition switch) and before the restart of the engine from the off state, the electrical loads 14a to 14c are always connected with the two storage batteries 11, 12. During the engine restart duration, the MOS switch 15 is maintained in the off state. Thus, the voltage fluctuation caused by the driving operation of the rotator 10 is suppressed from being transferred to the lead-acid battery 11 and each of the electrical loads 14a to 14c.

When the lead-acid battery 11 has a failure, such as a disconnection of the terminal from the connection object, by turning off the MOS switch 15, the power supply to the electrical loads 14a to 14c may be interrupted.

With consideration of the above-described case, the controller 20 determines whether a failure occurs to the lead-acid battery 11. When the lead-acid battery 11 is determined to be normal, that is no failure is detected, the MOS switch 15 is turned off in response to a restart of the engine. When the lead-acid battery 11 is determined to be abnormal, that is some failure is detected, the MOS switch 15 is maintained in the on state and the electrical loads 14a to 14c are continuously supplied with power from the lithium-ion battery 12.

When the engine automatically stops operation and the lead-acid battery 11 has some failure, in order to secure sufficient electric power for guaranteeing the vehicle travelling safety, the power consumption of the lithium-ion battery 12 needs to be favorably reduced. In the present embodiment, when the engine automatically stops and the lead-acid battery 11 has a failure, the power supply from the lithium-ion battery 12 to the electrical loads 14a to 14c is limited.

When the engine automatically stops due to the coasting travel control, since the vehicle is still in the travelling state, the power consumption of the lithium-ion battery 12 is limited with consideration of the travelling safety of the vehicle. In the automatic stop state of the engine, when the vehicle speed is higher than a predetermined threshold value Th, it is determined that the automatic engine stop is caused by the coasting travel control. In this case, power supply to the traveling related electrical load 14a is maintained, and the power supply to the electrical loads 14b and 14c that are not related to the vehicle travelling is limited. That is, the power supply to the electrical loads 14b and 14c is shut off. Hereinafter, each of the electrical loads 14b and 14c that is not related to the vehicle travelling is also referred to as a travelling non-related electrical load. Since the power supply to the travelling related electrical load is maintained, an evacuating travelling can be surely carried out by the driver of the vehicle for the safety purpose.

In the automatic stop state of the engine, when the vehicle speed is equal to or lower than the predetermined threshold value Th, it is determined that the automatic engine stop is caused by the idling reduction control. In this case, power supply to all of the electrical loads 14a to 14c is limited regardless of whether the electrical loads 14a to 14c are related to the vehicle travelling or not. With this configuration, the power consumption of the lithium-ion battery 12 can be reduced as much as possible.

Figure 4:
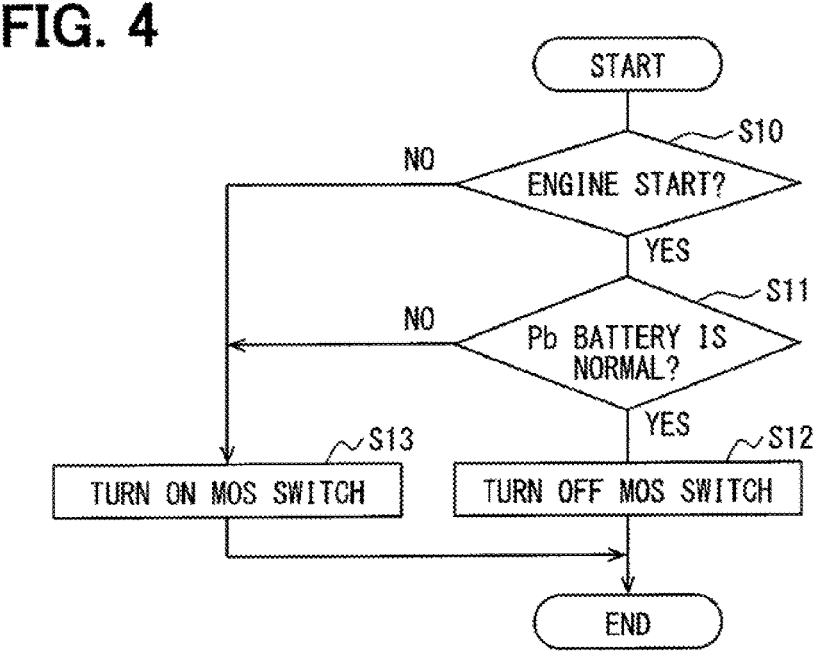
FIG. 4 is a flowchart showing a switch control process.
Figure 5:
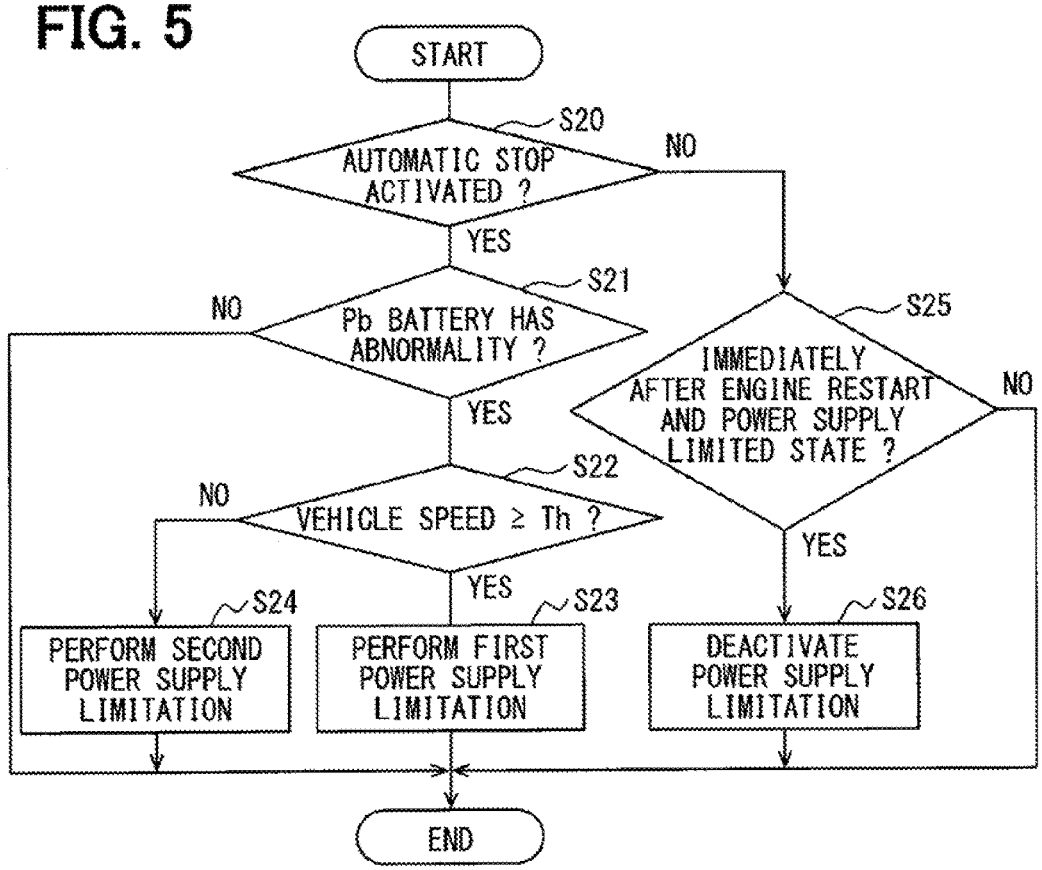
FIG. 5 is a flowchart showing a power limiting process.

The following will describe processes executed by the controller 20 with reference to FIG. 4 and FIG. 5. FIG. 4 is a flowchart showing a process executed by the controller 20 for controlling a turning on and a turning off of the MOS switch 15. FIG. 5 is a flowchart showing a process executed by the controller 20 for limiting the power supply. The processes shown in FIG. 4 and FIG. 5 are repeatedly executed at predetermined intervals after the vehicle power is turned on. In the following description, the SMR switch 16 is always in on state.

The following will describe the process shown in FIG. 4. At S10, the controller 20 determines whether the engine is started by the rotator 10. When the controller 20 determines the engine start at S10, the controller 20 determines whether the lead-acid battery 11 is in normal state at S11. That is, the controller 20 determines whether a failure occurs to the lead-acid battery 11. This determination is carded out based on the detected terminal voltage or detected current flowing through the lead-acid battery 11. At S11, when the controller 20 determines that the lead-acid battery 11 is in the normal state, the controller 20 turns off the MOS switch 15 at S12. At S11, when the controller 20 determines a failure occurs to the lead-acid battery 11, the controller keeps the MOS switch 15 in on state at S13. When a failure occurs to the lead-acid battery 11, the engine is started under a state in which the power supply to the electrical loads 14a to 14c is continued by the lithium-ion battery 12.

At S10, when the controller 20 determines no engine start, that is, at a time other than the engine start duration, the controller 20 proceeds to S13 and turns on the MOS switch 15. With this configuration, at a time other than the engine start duration, both the lead-acid battery 11 and the lithium-ion battery 12 are connected to the electrical loads 14a to 14c.

The following will describe the process shown in FIG. 5. At S20, the controller 20 determines whether the engine is in an automatic stop state. When the engine enters the automatic stop state due to the idling reduction control or the coasting travel control, the controller 20 determines the engine is in the automatic stop state at S20 and proceeds to S21. At S21, the controller 20 determines whether a failure occurs to the lead-acid battery 11. Thus, the controller 20 functions as an example of a failure determinator. For example, the failure of battery may refer to a state in which a terminal disconnection is occurred in the battery caused by a vibration or an acceleration G generated during a vehicle travelling. At S21, when the controller 20 determines that the lead-acid battery 11 is in the normal state, the process is ended. At S21, when the controller 20 determines that a failure occurs to the lead-acid battery 11, the controller proceeds to S22.

At S22, the controller 20 determines whether the vehicle speed is equal to or higher than the predetermined threshold value Th. The threshold value Th is preliminarily set to determine whether the automatic engine stop is caused by the idling reduction control or by the coasting travel control. For example, the threshold value Th may be set to 20 kilometers per hour.

At S22, when the controller 20 determines that the vehicle speed is equal to or higher than the threshold value Th, the controller 20 determines that the automatic engine stop is caused by the coasting travel control and carries out a first power supply limitation. In the first power supply limitation, power supply to the electrical loads 14b and 14c which are not related to the vehicle travelling is interrupted. At S22, when the controller 20 determines that the vehicle speed is lower than the threshold value Th, the controller 20 determines that the automatic engine stop is caused by the idling reduction control and carries out a second power supply limitation. In the second power supply limitation, power supply to all of the electrical loads 14a to 14c is interrupted.

At S20, when the controller 20 determines that the engine is not in the automatic stop state, the controller 20 proceeds to S25. At S25, the controller 20 determines whether the engine has been restarted immediately before and one of the first power supply limitation or the second power supply limitation is being carried out. When the controller 20 determines that the engine has been restarted immediately before and one of the first power supply limitation or the second power supply limitation is being carried out, the controller 20 proceeds to S26 and deactivates the power supply limitation which is being carried out.

Figure 6:
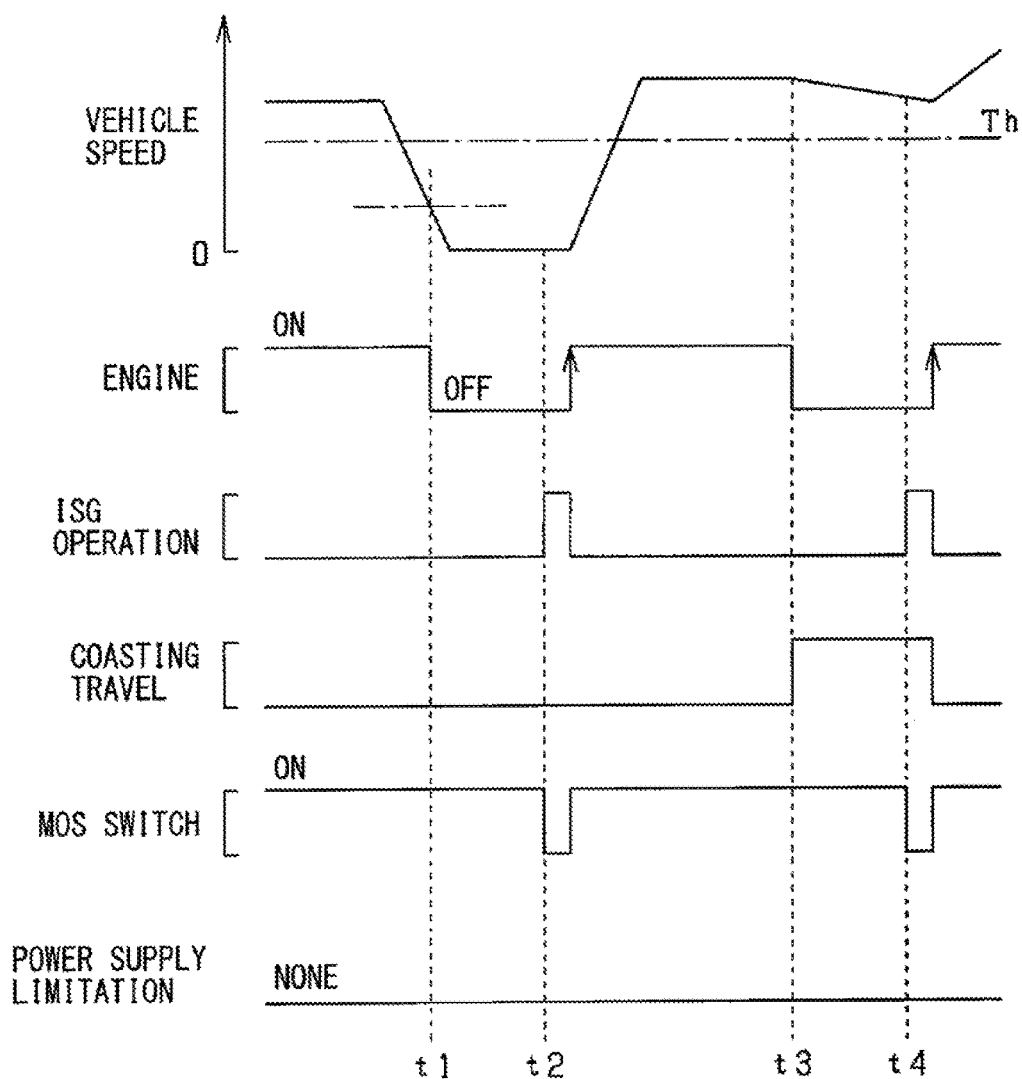
FIG. 6 is a time chart showing over-time signal changes related to a power supply during a vehicle travelling.
Figure 7:
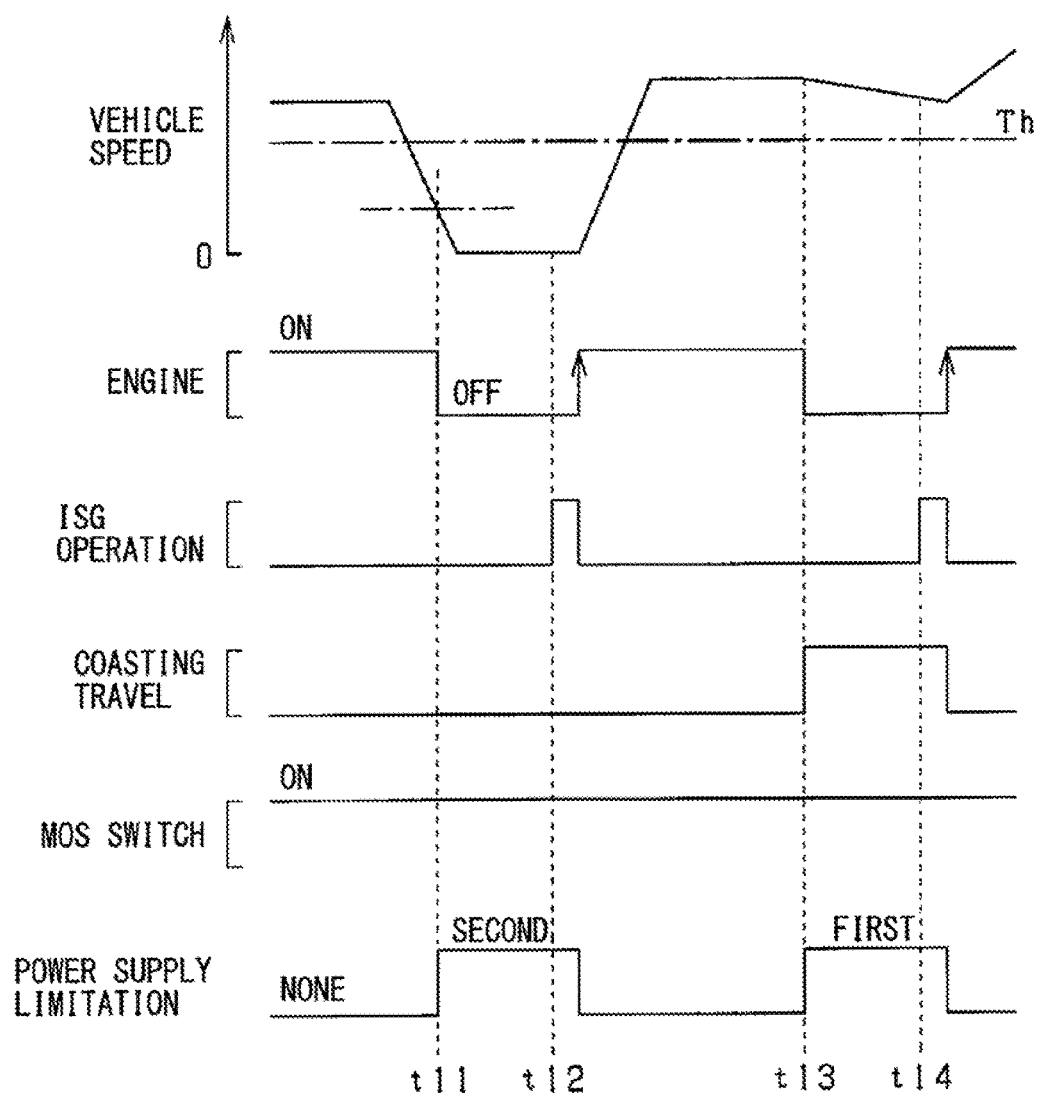
FIG. 7 is a time chart showing over-time signal changes related to a power supply during a vehicle travelling.

The following will describe a specific example for clarifying the above-described processes with reference to the time charts shown in FIG. 6 and FIG. 7. FIG. 6 is an execution example when the lead-acid battery 11 operates in normal state. FIG. 7 is an execution example when a failure occurs in the lead-acid battery 11.

As shown in FIG. 6, during the travelling state of the vehicle, suppose that the automatic engine stop condition is satisfied by the idling reduction control activated at a time point t1. In response to the activation of the idling reduction control, the engine automatically stops operation. The vehicle speed for activating the automatic engine stop condition may be set to, for example, 10 kilometers per hour, and suppose that the vehicle speed decreases to zero after one second. At this time, since the lead-acid battery 11 is in the normal operation state, the power supply limitation is not carried out by the controller 20.

At a time point t2, when the engine restart condition is satisfied by, for example, a turning on of the accelerator, the rotator 10 drives the engine to operate and the engine is restarted. At this time point t2, the MOS switch 15 is turned off so that a power fluctuation caused by the restart of the engine by the rotator 10 is not transferred to the lead-acid battery 11.

After a predetermined duration from the time point T2, the MOS switch 15 is turned on again and at the same time the vehicle starts travelling. During the travelling state of the vehicle, suppose that the automatic engine stop condition is satisfied by the coasting travel control activated at a time point t3. In response to the activation of the coasting travel control, the engine automatically stops operation under a state in which the vehicle speed is equal to or higher than the threshold value Th. In this case also, since the lead-acid battery 11 is in the normal operation state, the power supply limitation is not carried out by the controller 20. At a time point t4, when the engine restart condition is satisfied, the rotator 10 drives the engine to operate and the engine is restarted under the off state of the MOS switch 15. Thus, the power fluctuation caused by the restart of the engine by the rotator 10 is suppressed.

As shown in FIG. 7, during the travelling state of the vehicle, suppose that the automatic engine stop condition is satisfied by the idling reduction control activated at a time point t11. In response to the activation of the idling reduction control, the engine automatically stops operation. At this time, the vehicle speed is lower than the threshold value Th. In the case shown in FIG. 7, since the lead-acid battery 11 has a failure, the power supply from the lithium-ion battery 12 to the electrical loads 14a to 14c is limited. That is, the second power supply limitation corresponding to the idling reduction control is carried out.

At a time point t12, suppose that the engine restart condition is satisfied. Thus, the engine restarts operation driven by the rotator 10. At this time, since the lead-acid battery 11 has a failure, the MOS switch 15 is maintained in the on state to maintain the connected state of the lithium-ion battery 12 for the power supply to the electrical loads 14a to 14c. When the engine restart is completed, the second power supply limitation is deactivated.

Suppose that the vehicle starts travelling again, and the engine automatic stop condition is satisfied by the coasting travel control at a time point t13. Thus, the engine automatically stops operation in response to the activation of the coasting travel control. At this time, the vehicle speed is equal to or higher than the threshold value Th. In the case shown in FIG. 7, since the lead-acid battery 11 has a failure, the power supply from the lithium-ion battery 12 to the travelling related electrical load 14a is maintained, and the power supply to the travelling non-related electrical loads 14b and 14c is limited. That is, the first power supply limitation is carried out. At a time point t14, when the engine restart condition is satisfied, the engine restarts the operation under a state in which the on state of the MOS switch 15 is maintained, and the first power supply limitation is deactivated.

The above-described configuration provides the following advantages.

As described above, the electric power source system is applied to a vehicle, which is equipped with two kinds of batteries including the lead-acid battery 11 and the lithium-ion battery 12. The electric power source system includes the MOS switch 15 disposed between the two storage batteries 11, 12 as a switch device. Further, the electric power source system includes electrical loads 14a to 14c disposed closer to the lead-acid battery 11, compared with the MOS switch 15 and the lithium-ion battery 12. Compared with an exemplary electric power source system which has only one storage battery, such as the lead-acid battery 11, the electric power source system according to the present embodiment has similar connection configuration of the electrical loads with the exemplary electric power source system. Thus, based on the exemplary electric power source system which has only one storage battery, the electric power source system including two storage batteries according to the present embodiment can be easily configured and electric wiring change can be substantially reduced. That is, the advantageous configuration can be realized in configuring of the two battery system.

After the power switch of the vehicle is turned on, the MOS switch 15 is maintained in the off (open) state during the engine start. Herein, the turning on of the power switch refers to a state in which electric power is supplied to the vehicle electric loads but engine is in a deactivated stated. For example, the electric power may be supplied to the vehicle electric loads by operating an ignition switch or a start button. In other states except the engine start state, the MOS switch 15 is maintained in the on (closed) state. With this configuration, the voltage fluctuation caused by the engine start driven by the rotator 10 is avoided from being transferred to the lead-acid battery 11. At the same time, the power from both the lead-acid battery 11 and the lithium-ion battery 12 can be supplied to the electrical loads 14a to 14c. With this configuration, when a failure occurs to the lead-acid battery 11, the electrical loads 14a to 14c can be continuously supplied with power from the lithium-ion battery 12. With this configuration, the power supply to the electrical loads 14a to 14c can be properly and continuously carried out by the electric power source system.

During the engine start, when a failure occurs to the lead-acid battery 11 and the MOS switch 15 is in the off state, electric power may not be properly supplied to the electrical loads 14a to 14c by the lead-acid battery 11. In the present embodiment, when the lead-acid battery 11 is determined to be abnormal, that is some failure is detected, the MOS switch 15 is switched to the on state during the engine start. Thus, even though the lead-acid battery 11 has a failure, the electrical loads 14a to 14c can be continuously and stably supplied with power by another battery 12.

It is considered that a restart of the engine is carried out by the rotator 10 when the engine automatically stops operation in response to the idling reduction control or coasting travel control. The following will compare the engine restart in idling reduction control and the coasting travel control. When the engine restart is carried out after automatic engine stop caused by the idling reduction control, the vehicle speed is substantially low or close to zero. In contrast, when the engine restart is carried out after the automatic engine stop caused by the coasting travel control, the vehicle speed is relatively higher than the vehicle speed corresponding to the idling reduction control. Thus, it is considered that the voltage fluctuation of the power source may more adversely affect the vehicle travelling during the coasting travel control compared with the idling reduction control. Under this consideration, in a case where the lead-acid battery 11 has a failure, when the engine is in a restart state and the vehicle speed is equal to or higher than a predetermined speed, only the power supply to the electrical loads that are not related to the vehicle travelling is limited. Thus, the power supply limitation can be properly carried out with consideration of the actual vehicle travelling state and travelling safety.

In a system which uses the ISG as the rotator 10, the rotator 10 is switched between an electric power generation state and an engine start state (engine driving state). Thus, the rotator 10 cannot generate the electric power when the engine is in the restart state assisted by the rotator 10. Thus, the power supply limitation during the engine restart state is considered to be necessary and effective. Specially, when the lead-acid battery 11 has a failure during the engine restart state, the power supply limitation is more necessary and effective.

While the disclosure has been described with reference to preferred embodiment thereof, it is to be understood that the disclosure is not limited to the preferred embodiment and constructions. The disclosure is intended to cover various modification and equivalent arrangements. Some of the examples will be described in the following. In addition, while the various combinations and configurations, which are preferred, other combinations and configurations, including more, less or only a single element, are also within the spirit and scope of the disclosure. In the following description, the same reference number or symbol is used for the same or equivalent part.

In the process shown in FIG. 5, when the controller 20 determines an occurrence of a failure in the lead-acid battery 11 at S21 and determines the vehicle speed is equal to or higher than the threshold value Th, the power supply to the electrical loads 14b, 14c that are not related to the vehicle travelling is limited. When limiting the power supply to the electrical loads 14b, 14c that are not related to the vehicle travelling, the following configuration may be adopted. In the power supply limitation, multiple levels can be set corresponding to the vehicle speed, and the power supply limitation level may be increased with a higher vehicle speed, and the power supply limitation level may be decreased with a lower vehicle speed. As an example of the multiple levels, the number of the target electrical loads to which the power supply are limited can be set differently according to the vehicle speed.

In the process shown in FIG. 5, the controller 20 may omit the failure determination on the lead-acid battery 11 at S21. That is, at S20, when the controller 20 determines that the engine automatically stops operation, regardless of the failure occurrence in the lead-acid battery 11, the controller 20 may be configured to perform the power supply limitation to the electrical loads at S23 and S24 based on the vehicle speed. Herein, at S23, the first power supply limitation is carried out corresponding to the coasting travel control, and at S24, the second power supply limitation is carried out corresponding to the idling reduction control.

In the process shown in FIG. 5, the controller 20 may omit the vehicle speed comparison with the threshold value Th at S22. For example, when the controller 20 determines the automatic engine stop at S20 and determines the failure occurrence in the lead-acid battery 11 at S21, the controller 20 may perform a power supply limitation to the electrical loads (for example, only to the electrical loads that are not related to the vehicle travelling). When the controller 20 determines the automatic engine stop at S20 but determines no failure occurrence in the lead-acid battery 11 at S21, the controller 20 may not perform any power supply limitation.

In the foregoing embodiments, when the engine automatic stop condition is satisfied in response to the activation of the coasting travel control, the engine automatically stops operation. As another example, the engine may not automatically stop operation even when the engine automatic stop condition is satisfied in response to the activation of the coasting travel control.

In the foregoing embodiments, the SMR switch 16 is disposed on the second connection path 22 between the connection point N1 of the first connection path 21 and the lithium-ion battery 12. As another example, the SMR switch 16 may be removed from the second connection path 22.

In the foregoing embodiments, when a failure occurs to the lead-acid battery 11, the MOS switch 15 is turned on to secure a power supply path to the electrical loads 14a to 14c in the two battery system. As another example shown in FIG. 8, a bypass path L may be disposed bypassing the first connection path 21 on which the MOS switch 15 is disposed. On the bypass path L, a diode 17 may be disposed as the power supply control device so that an anode of the diode 17 is connected to the lithium-ion battery 12 and a cathode of the diode 17 is connected to the electrical loads 14a to 14c. In this configuration, when the lead-acid battery 11 has a failure occurrence during the open state of the MOS switch 15, the power supply may be performed by the lithium-ion battery 12 to the electrical loads 14a to 14c via the bypass path L. In the configuration shown in FIG. 8, during the engine restart state after the idling reduction control or after the coasting travel control, even though the lead-acid battery 11 has a failure occurrence, the lithium-ion battery 12 can supply power to the electrical loads 14a to 14c via the diode 17 disposed on the bypass path L.

Figure 8:
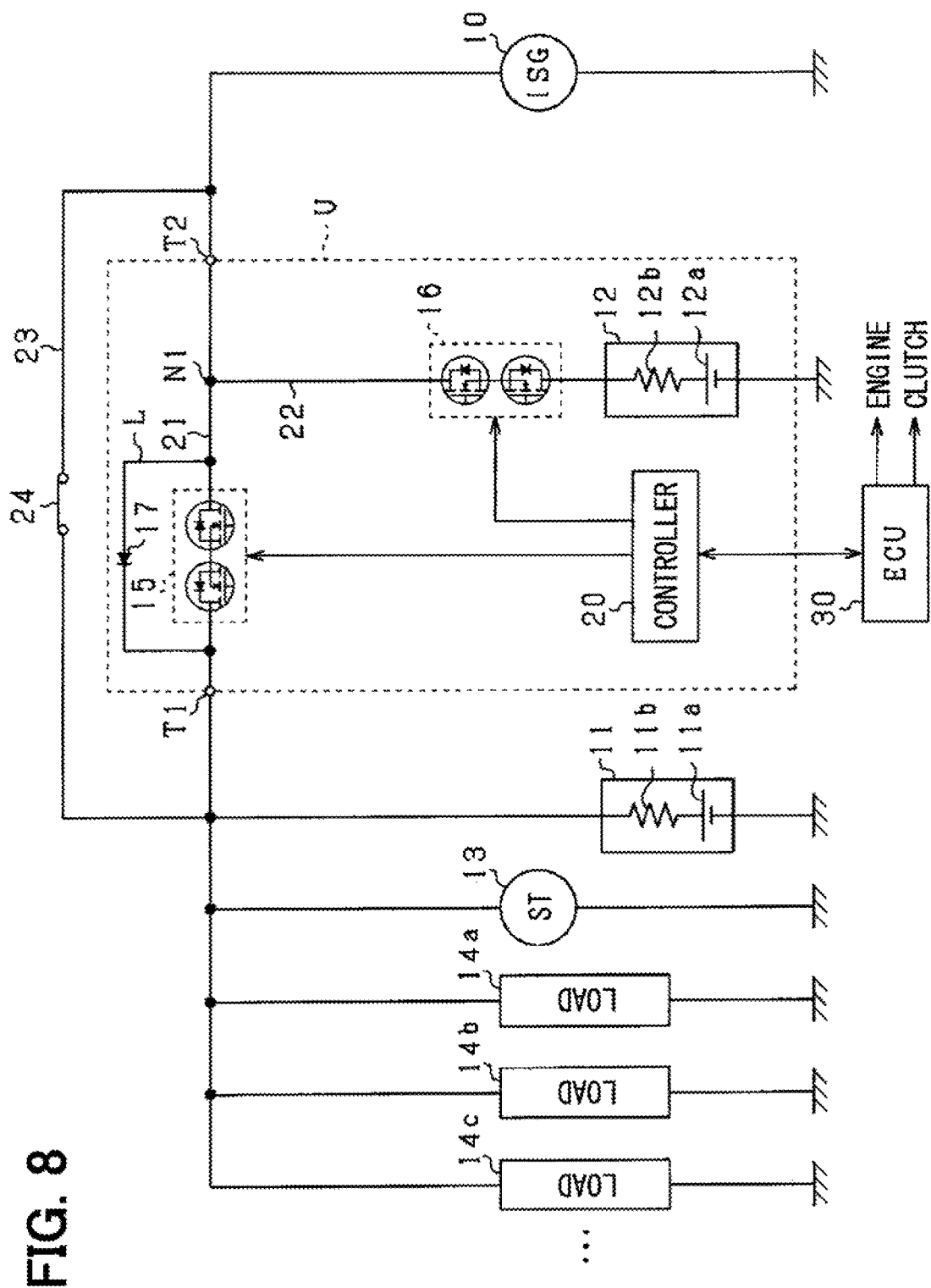
FIG. 8 is a circuit diagram showing an electric power source system according to another embodiment of the present disclosure.

The process shown in FIG. 4 may also be executed in the configuration shown in FIG. 8. In this case, when the lead-acid battery 11 has the failure occurrence, the power supply from the lithium-ion battery 12 to the electrical loads 14a to 14c can be continuously performed by at least one of the first connection path 21 on which the MOS switch 15 is disposed or the bypass path L on which the diode 17 is disposed.

In the foregoing embodiments, the MOS switch 15 may be maintained in the open state during the engine start state driven by the starter 13.

In the foregoing embodiments, the controller 20 determines the vehicle speed at S22 and limits the power supply to the electrical loads 14a to 14c at S23 and S24. As another example, the ECU 30 connected to the controller 20 may perform the determination of the vehicle speed and performs the electric power supply limitation to the electrical loads 14a to 14c. Thus, the controller 20 or the ECU 30 functions as an example of a vehicle speed determinator and a power supply limitator.

What is claimed is:

1. An electric power source system for a vehicle, the vehicle including a starting device driven by an electric power and starting an engine of the vehicle, the starting device being provided by an electric power generator, the electric power source system comprising:
   a lead-acid battery electrically connected with the starting device in parallel as a first storage battery;
   a second storage battery electrically connected with the starting device, the lead-acid battery and the second storage battery being connected in parallel with respect to the starting device;
   a switch device disposed between the lead-acid battery and the second storage battery on an electrical path that electrically connects the lead-acid battery with the second storage battery;
   at least one electrical load electrically connected to the electrical path and disposed closer to the lead-acid battery compared with the second storage battery on the electrical path;
   a switch controller, after a power of the vehicle is turned on, controlling the switch device to maintain a closed state except an engine start duration while the engine is being started by the starting device; and
   a power supply control device disposed on a bypass path, wherein
   the bypass path bypasses the switch device and is connected to the electrical path that connects the lead-acid battery with the second storage battery, and
   when a failure occurrence is determined in the lead-acid battery, the power supply control device activates a power supply from the second storage battery to the at least one electrical load.

2. The electric power source system according to claim 1, further comprising:
   a failure determinator determining whether a failure is occurred in the lead-acid battery,
   wherein, when the failure determinator determines a failure occurrence in the lead-acid battery, the switch controller sets the switch device to the closed state during the engine start duration.

3. The electric power source system according to claim 2, further comprising:
   a vehicle speed determinator determining whether a vehicle speed is equal to or higher than a threshold value; and
   a power supply limitator limiting a power supply to the at least one electrical load, wherein
   the at least one electrical load includes a travelling related electrical load that is related to a vehicle travelling and a travelling non-related electrical load that is not related to the vehicle travelling, and
   when a failure occurrence is determined in the lead-acid battery and the vehicle speed is determined to be equal to or higher than the threshold value, the power supply limitator limits the power supply to the travelling non-related electrical load.

4. The electric power source system according to claim 3, wherein,
   when a failure occurrence is determined in the lead-acid battery and the vehicle speed is determined to be lower than the threshold value, the power supply limitator limits the power supply to at least one of the travelling related electrical load or the travelling non-related electrical load.

5. The electric power source system according to claim 3, wherein
   the power supply limitator sets a limiting level of the power supply to the travelling related electrical load or to the travelling non-related electrical load corresponding to the vehicle speed determined by the vehicle speed determinator.

6. The electric power source system according to claim 2, wherein
the electric power generator used as the starting device is a motor generator which has a starting function as the starting device, and
the motor generator is electrically connected to the electrical path and is disposed closer to the lead-acid battery compared with the switch device on the electrical path.

7. The electric power source system according to claim 1, wherein
the power supply control device is provided by a diode connected with the switch device in parallel with a direction from the second storage battery toward the at least one electrical load as a forward direction.

\* \* \* \* \*